United States Patent [19]

Schwab

[11] Patent Number: 5,535,313
[45] Date of Patent: Jul. 9, 1996

[54] AUTOMATED QUALITY CONTROL IN A DOCUMENT CONVERSION SYSTEM

[75] Inventor: Suzanne E. Schwab, Apache Junction, Ariz.

[73] Assignee: Motorola, Inc., Schaumburg, Ill.

[21] Appl. No.: 276,372

[22] Filed: Jul. 18, 1994

[51] Int. Cl.$^6$ .................................................. G06K 9/03
[52] U.S. Cl. ........................................... 395/118; 382/112
[58] Field of Search ............................. 395/118; 382/228, 382/229, 127, 310, 311, 224, 226, 337

[56] References Cited

U.S. PATENT DOCUMENTS

| | | | |
|---|---|---|---|
| 4,674,065 | 6/1987 | Lange et al. ........................... | 382/311 |
| 5,048,113 | 9/1991 | Yamagata et al. ..................... | 382/310 |
| 5,359,673 | 10/1994 | de La Beajardiere ............... | 382/310 X |
| 5,418,864 | 5/1995 | Murdock et al. ................... | 382/229 X |
| 5,436,983 | 7/1995 | Bernzott et al. ..................... | 382/229 |

*Primary Examiner*—Heather R. Herndon
*Assistant Examiner*—Cliff N. Vo
*Attorney, Agent, or Firm*—S. Kevin Pickens

[57] ABSTRACT

Automated quality control is provided in a document conversion system. A scanner scans and converts printed documents into digital data. A computer stores the digital data into one or more files which are then displayed on a monitor for view by an operator. The computer obtains from the operator an error count of conversion errors observed by comparing the printed documents scanned to the diplayed files. The computer calculates a conversion accuracy percentage based on the number of conversion errors.

7 Claims, 3 Drawing Sheets

AUTOMATED QUALITY CONTROL IN A DOCUMENT CONVERSION SYSTEM

TECHNICAL FIELD

This invention relates generally to document conversion and, more particularly, to quality control in a document conversion system.

BACKGROUND OF THE INVENTION

A conventional document conversion system scans printed documents and converts the documents into digital data. The digital data can then be stored by computer in an appropriate file. For example, printed text documents are converted and stored into text files, such as ASCII files. Likewise, printed graphic image documents are converted and stored into bitmap files such as Tagged Image File Format (TIFF) files. The converted documents can then be copied, edited, transferred, displayed and otherwise maintained as digital data.

Quality control is essential in a document conversion system. In the case of text documents, each printed character must be recognized using optical character recognition techniques. Optical character recognition is imperfect, however, and its imperfection increases when text documents of lower print quality are scanned. For example, the number "1" may be converted into the letter "l". Similarly, in the case of graphic image documents, graphic conversion errors may occur during conversion, such as raster errors. The quality of the converted image is compromised as a result. Thus, quality control is necessary for both text documents and graphic image documents to ensure that the documents are converted accurately.

Conventional quality control in document conversion is a manual process. After each printed document is scanned, converted and stored in a file, the file is printed out and compared to the original printed document by a human operator. The operator then records the number of conversion errors that occurred in converting each printed document. Unfortunately, printing out each file is very time-consuming. This becomes a severe problem when large batches of documents are converted.

Furthermore, to determine the accuracy of the conversion process, the operator must manually calculate a conversion accuracy percentage. In the case of text documents, for example, the operator must count all of the characters in the documents, count all of the erroneously scanned characters, and then determine the conversion accuracy percentage based on these values. This is also very time consuming, especially when large batches of documents are converted.

Still further, conventional quality control employs 100% manual inspection. That is, every single scanned document is printed and the printout is visually examined by the operator. This is a very cumbersome process. Moreover, the method is fully dependent on the human operator to calculate the conversion accuracy percentage correctly. As a result, the process is quite error-prone. Thus, a more efficient method is needed for providing quality control in a document conversion system.

DESCRIPTION OF THE PREFERRED EMBODIMENTS

Figure 1:
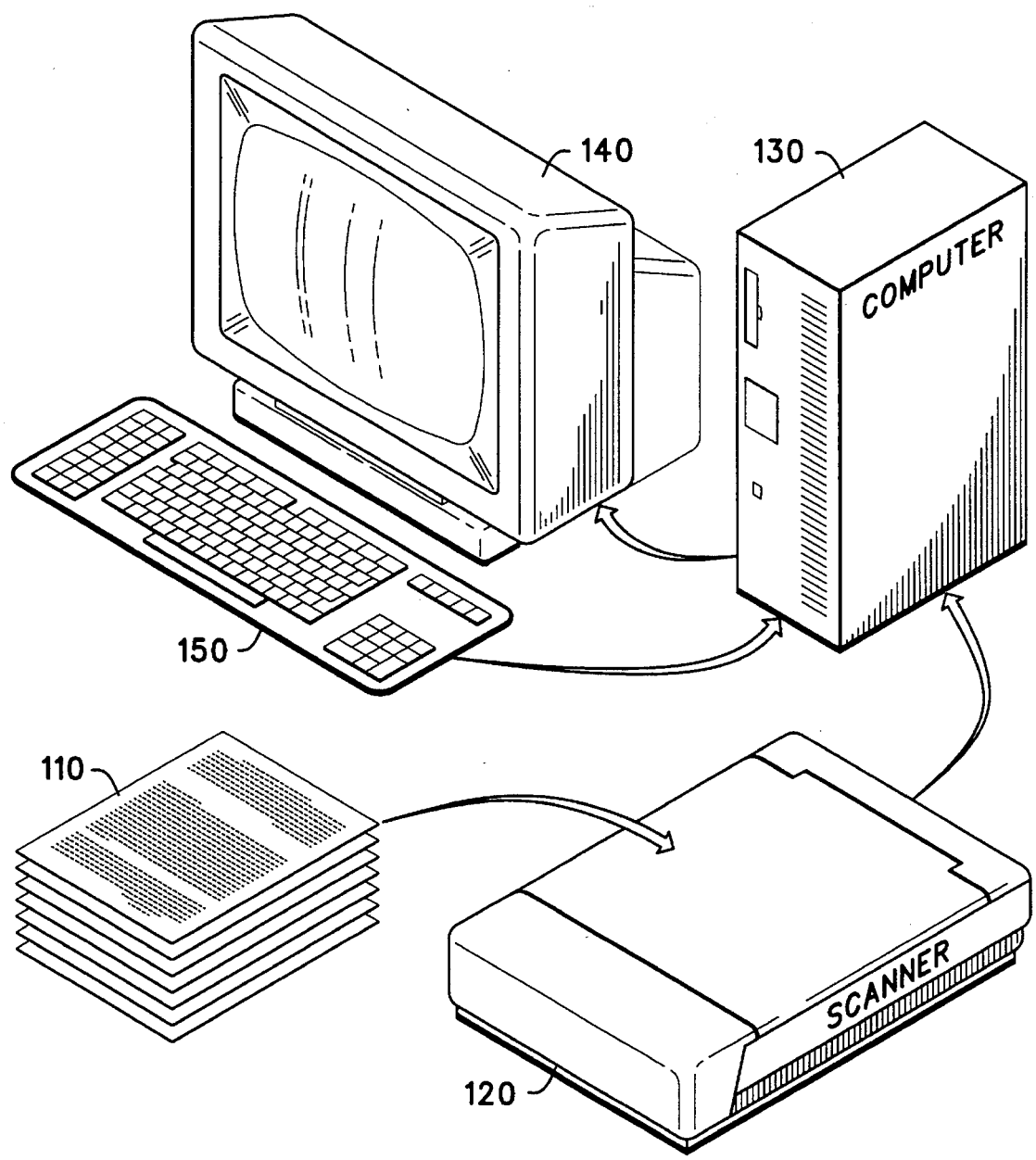
FIG. 1 is block diagram of a document conversion system configured in accordance with in the preferred embodiment.

A preferred embodiment of the present invention provides automated quality control in a document conversion system. In the preferred embodiment, a scanner scans one or more pages of printed documents and converts the printed documents into digital data. A computer then stores the digital data into one or more files. The computer displays the files on a monitor for view by an operator. The computer obtains from the operator an error count of conversion errors observed by comparing the pages of the printed documents to the displayed files. The computer calculates a conversion accuracy percentage based on the number of conversion errors.

As a result, the preferred embodiment provides several advantages. Because the documents are displayed to the operator, no time-consuming printing of the documents is necessary. Also, because the computer automatically calculates the conversion accuracy percentage, the calculation is performed quickly and without being subject to manual errors. Thus, an accurate and tangible quantification of conversion quality is provided without requiring the operator to do anything more than count the number of conversion errors and provide it to the computer.

In a first aspect of the preferred embodiment, the printed documents are printed text documents. The printed text documents are scanned using optical character recognition to produce character data. The character data is stored in one or more text files, such as ASCII files. The computer displays the text files on the monitor and obtains from the operator a character error count of incorrectly scanned characters. The computer calculates a character count of all characters scanned. The computer then calculates the conversion accuracy percentage based on the character error count compared to the character count. Thus, the first aspect of the preferred embodiment provides the advantage of determining the conversion accuracy percentage of printed text documents without requiring the operator to count every character scanned.

In a second aspect of the preferred embodiment, the printed documents are printed graphic image documents. The printed graphic image documents are scanned using raster scanning or other graphic recognition techniques to produce graphic data. The graphic data is stored in one or more bitmap files, such as tagged image format files (TIFF files). The computer displays the bitmap files on the monitor as graphic images and obtains from the operator a graphic error count of incorrectly scanned pages. The computer then calculates a page count of graphic pages scanned. The computer also calculates the conversion accuracy percentage based on the graphic error count compared to the page count. Thus, the second aspect of the preferred embodiment provides the advantage of determining the conversion accuracy percentage of printed graphic image documemnts without requiring he operator to count every page scanned.

In a third aspect of the preferred embodiment, the computer obtains from the operator an indication of a sample size of pages to sample. This indication is, for example, a sample percentage of the pages scanned. The computer calculates the sample size based on the sample percentage and the page count. The computer randomly selects a number of the sample pages equal to the sample size. The computer displays on the monitor the files which store the digital data to which the randomly selected sample pages were converted. The pages are randomly selected using, for example, a random number generator function to produce a number of randomly selected page identifiers. The files corresponding to the sample pages identified by the page identifiers are then displayed to the operator.

The third aspect of the preferred embodiment provides the advantage of efficiency. By intelligently selecting a sample size, a reasonably accurate conversion accuracy percentage is obtained without having engage in the time-consuming process of checking every single page. Further, it is not necessary for the operator to determine the total number of pages or characters in order to choose an adequate sample size. Because the computer counts the pages and characters scanned, the operator need only enter a desired sample percentage. Still further, the advantage of objectivity is also obtained as a result of using a random number generator function to select the sample pages.

In a fourth aspect of the preferred embodiment, the automatic quality control process of the preferred embodiment, including any of the aspects of this process described above, may be repeated multiple times for corresponding multiple batches of text documents or graphic images. In addition to calculating the conversion accuracy of each batch in the manner described above, the computer calculates a total conversion accuracy percentage for all batches based on the conversion accuracy of each batch. This provides the advantage of a thorough evaluation of the conversion process while maintaining in the ability to sort out and analyze batches having an undesirable conversion accuracy percentage.

The preferred embodiment of the invention will now be described in detail. FIG. 1 shows a simple block diagram of the document conversion system in which the preferred embodiment is implemented. As shown in FIG. 1, pages of printed documents 110 are provided to a scanner 120. The scanner 120 scans the pages and converts them into digital data. The scanner 120 can be any scanning device capable of converting printed material into digital data. Such scanning devices are well known to one of ordinary skill in the art.

The scanner 120 provides the digital data to the computer 130. The computer 130 stores the digital data into one or more files in memory. The computer 130 can be any computer having a memory capable of storing files of digital data and an input/output unit capable of obtaining input from an input device and provididing output to an output device. The computer runs the UNIX operating system. One of ordinary skill in the art will readily adapt a wide variety of different computers and operating systems to perform the well-known functions of reading from and writing to memory, obtaining input from an input device and providing output to a display device.

The computer displays the files to an operator via a monitor 140 or any other suitable display device. The operator compares the displayed files to coresponding pages of the printed documents 110 and records any conversion errors. The operator then enters an error count of the conversion errors via keyboard 150 or any other suitable input means, such as a mouse, a pen, etc. The operator may also enter via the keyboard 150 a sample percentage of the pages of printed documents 110. The computer 130 determines, based on the error count, a conversion accuracy percentage of the conversion of the pages of printed documents 110. When a sample percentage is entered by the operator via the keyboard 150, the computer 130 determines the conversion accuracy percentage only for a randomly selected sample of the pages having a sample size based on the sample percentage entered.

Figure 2:
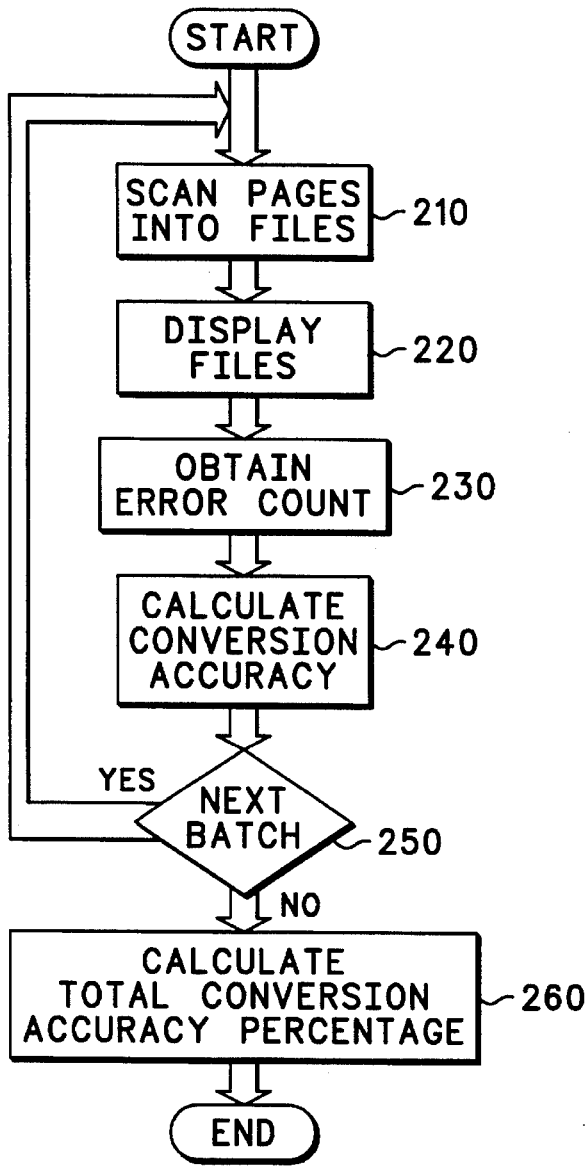
FIG. 2 is a flow diagram of the overall document conversion process performed in accordance with the preferred embodiment.

FIG. 2 shows a flow diagram of the overall document conversion process performed in accordance with the preferred embodiment. In step 210 of FIG. 2, the scanner 120 scans the pages of printed documents 110 and converts the printed documents into digital data which is then stored by the computer 130 in one or more corresponding files. Where the printed documents are text documents, the computer 130 converts the pages into character data using optical character recognition. Optical character recognition is well known to one of ordinary skill in the art. The computer 130 stores the character data in text files, such as ASCII files. Where the printed documents are graphic image documents, the computer 130 converts the pages into graphic image data using graphic image recognition techniques, such as raster scanning, which is well known to one of ordinary skill in the art. The computer 130 stores the graphic data in one or more bitmap files, such as tagged image format files (TIFF files).

In step 220, the monitor 140 displays the files for view by the operator. The operator views the displayed files and compares them to corresponding scanned pages of printed documents 110, recording all conversion errors. The computer 130 then obtains in step 230 an error count of the conversion errors which the operator enters into the keyboard 150. Errors are recorded differently for text document conversion than for graphic document conversion. Where the documents scanned are text documents, the error count is a character error count of each incorrectly converted character. Where the documents scanned are graphic image documents, the error count is a graphic error count of each page having a graphic image that has been incorrectly converted.

Figure 3:
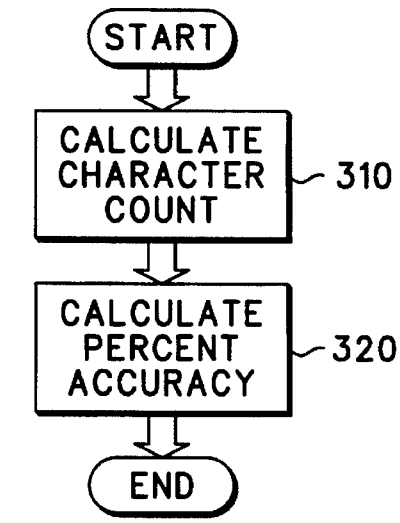
FIG. 3 is a flow diagram of the process of determining conversion accuracy for text documents in accordance with a first aspect of the preferred embodiment.

In step 240, the computer 130 calculates the conversion accuracy percentage of the conversion of printed documents 110 based on the error count obtained from the operator. The conversion accuracy percentage is determined differently when the documents scanned are text documents than when they are graphic image documents. FIG. 3 is a flow diagram of the process of determining the conversion accuracy percentage for printed documents. In step 310 of FIG. 3, the computer 130 calculates a character count of the number of characters scanned. In step 320, the computer 130 then calculates the conversion accuracy percentage as a character accuracy percentage based on the character error count relative to the character count:

$$\text{conversion accuracy percentage} = 100 - \frac{\text{character error count}}{\text{character count}} * 100$$

For example, if 1200 characters are scanned and 300 are found to be converted incorrectly, the conversion accuracy percentage would be 100−(300/1200)*100=100−25=75%.

Figure 4:
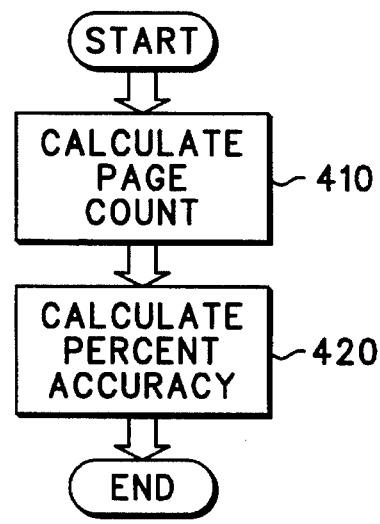
FIG. 4 is a flow diagram of the process of determining conversion accuracy for graphic image documents in accordance with a second aspect of the preferred embodiment.

As noted above, the conversion accuracy percentage is determined differently when the documents scanned are graphic image documents than when they are text documents. FIG. 4 is a flow diagram of the process of determining the conversion accuracy percentage for graphic image documents. In step 410 of FIG. 4, the computer 130 calculates a page count of the number of pages scanned. In step 420, the computer 130 then calculates the conversion accuracy percentage as a graphic accuracy percentage based on the graphic error count relative to the page count:

$$\text{conversion accuracy percentage} = 100 - \frac{\text{graphic error count}}{\text{page count}} * 100$$

For example, if 50 pages are scanned and 5 are found to be converted incorrectly, the conversion accuracy percentage would be 100−(5/50)*100=100−10=90%.

Returning now to FIG. 2, once the conversion accuracy has been calculated in step 240, the computer determines in step 250 whether additional batches of printed documents are to be converted. If there is a next batch to be converted, then the document conversion process loops back to step 210. Steps 210 through 250 are repeated as long as additional batches are indicated in step 250. When no additional batches are indicated in step 250, a total conversion accuracy percentage is calculated in step 260 based on all batches. The total conversion accuracy percentage for text documents is:

total conversion accuracy percentage =

$$100 - \frac{\text{total character error count}}{\text{total character count}} * 100$$

Similarly, the total conversion accuracy percentage for graphic image documents is:

total conversion accuracy percentage =

$$100 - \frac{\text{total graphic error count}}{\text{total page count}} * 100$$

Figure 5:
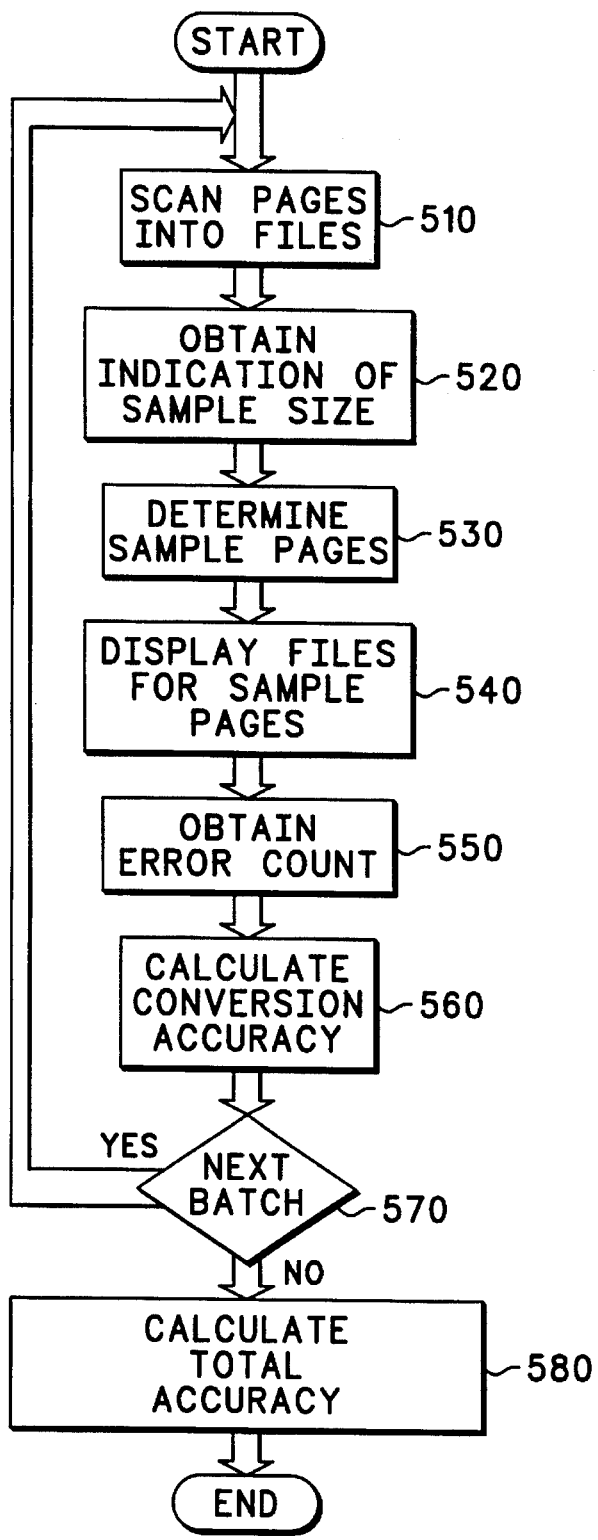
FIG. 5 is a flow diagram of the overall document conversion process performed particularly in accordance with a third aspect of the preferred embodiment.

FIG. 5 shows a flow diagram of the overall document conversion process performed in accordance with the preferred embodiment wherein the conversion accuracy percentage is determined for only a sample of the printed documents 110 scanned. In step 510 of FIG. 5, the scanner 120 scans the pages of printed documents 110 and converts the pages into digital data which is then stored by the computer 130 in one or more corresponding files. Where the printed documents are text documents, the computer 130 converts the pages into character data using optical character recognition techniques. The computer 130 stores the character data in one or more text files, such as ASCII files. Where the printed documents are graphic image documents, the computer 130 converts the pages into graphic image using graphic recognition techniques, such as raster scanning. The computer 130 stores the graphic data in bitmap files, such as tagged image format files (TIFF files).

Figure 6:
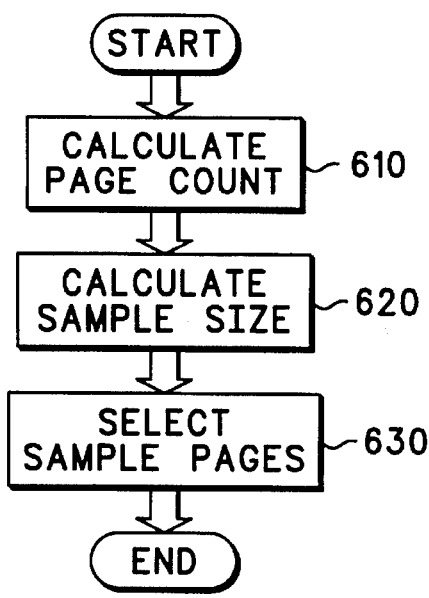
FIG. 6 is a flow diagram of the process of obtaining a sample size in the third aspect of the preferred embodiment.

In step 520, the computer 130 obtains from the operator an indication of a sample size via the keyboard 150. The indication is, for example, a sample percentage which indicates the percentage of all pages scanned that are to be sampled. In step 530, the computer 130 determines which pages of the scanned printed documents 100 are to be sampled. This process is illustrated in more detail in FIG. 6. In step 610 of FIG. 6, the computer calculates a page count of pages scanned. In step 620, the computer 130 calculates a sample size based on the page count and the sample percentage entered by the operator:

$$\text{sample size} = \text{page count} * \frac{\text{sample percentage}}{100}$$

For example, if the page count is 1000 pages and the sample percentage is 5%, then the sample size will be 1000*5/100= 50 pages.

In step 630, the computer 130 selects the specific pages of the scanned printed documents to use as sample pages. Preferably, the computer 130 applies a random number generator function to randomly select a number of pages of the scanned printed documents 110 equal to the sample size. The selected pages are represented, for example, by a list of integers, each of which corresponds to a file that stores the digital data into which the pages were converted. Returning to FIG. 5, the monitor 140 displays the selected sample pages to the operator in step 540. For example, the list of integers representing each sample page in the above example is traversed, displaying each file corresponding to each integer on the list. The operator views the displayed files and compares them to corresponding scanned pages of printed documents 110, recording all conversion errors.

The computer 130 then obtains in step 550 an error count of the conversion errors which the operator enters into the keyboard 150. As discussed above, errors are recorded differently for text document conversion than for graphic document conversion. Where the documents scanned are text documents, the error count is a character error count of all incorrectly converted characters. Where the documents scanned are graphic image documents, the error count is a graphic error count of each page 110 having a graphic image that has been incorrectly converted.

In step 560, the computer 130 calculates the conversion accuracy percentage of the conversion of the printed documents 110 based on the error count obtained from the operator. As explained above, the conversion accuracy percentage is determined differently when the scanned printed documents 110 are text documents than when they are graphic image documents. FIG. 3, which has been discussed above, is a flow diagram of the process of determining conversion accuracy percentage for text documents. To briefly review FIG. 3, in step 310, the computer 130 calculates a character count of the number of characters scanned. In step 320, the computer 130 then calculates the conversion accuracy percentage based on the character error count relative to the character count. FIG. 4, which has also been discussed above, is a flow diagram of the process of determining a conversion accuracy percentage for graphic image documents. Briefly reviewing FIG. 4, in step 410, the computer 130 calculates a page count of the number of pages scanned. In step 420, the computer 130 then calculates the conversion accuracy percentage based on the graphic error count relative to the page count.

Returning again to FIG. 5, once the conversion accuracy has been calculated in step 560, the computer determines in step 570 whether additional batches of printed documents are to be converted. If there is a next batch to be checked, then the document conversion process loops back to step 510. Steps 510 through 570 are repeated as long as additional batches are indicated in step 570. When no additional batches are indicated in step 570, a total conversion accuracy percentage is calculated in step 580 based on all batches as described above with respect to FIG. 2.

While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. A method of providing automated quality control in a document conversion system having a computer coupled to a scanner and a monitor, the method comprising the steps of:

(a) the scanner scanning one or more printed documents and converting the printed documents into digital data;

(b) the computer storing the digital data into one or more files;

(c) the computer obtaining from an operator an indication of a sample size;

(d) the monitor displaying to the operator a number of the files representing a number of sample pages of the printed documents, the number of sample pages being equal to the sample size indicated in step (c);

(e) the computer obtaining an error count from the operator observed by comparing the files displayed in step (d) to the printed documents scanned; and (f) the computer calculating a conversion accuracy based on the error count obtained in step (e);

wherein step (c) comprises (c1) calculating a page count of pages of the printed documents scanned, (c2) obtaining a sample percentage from the operator, and (c3) calculating the sample size based on the sample percentage applied to the page count; and wherein step (d) comprises (d1) applying a random number generator function to the page count to produce a number of randomly selected identifiers of the pages scanned, the number of randomly selected page identifiers being equal to the sample size, and (d2) displaying the files representing the sample pages identified by the page identifiers.

2. A method of providing automated quality control in a document conversion system having a computer coupled to a scanner and a monitor, the method comprising the steps of:

(a) scanning one or more printed documents and converting the printed documents into digital data;

(b) storing the digital data into one or more files;

(c) obtaining from an operator an indication of a sample size;

(d) displaying to the operator a number of the files representing a number of sample pages of the printed documents, the number of sample pages being equal to the sample size indicated in step (c);

(e) obtaining an error count from the operator observed by comparing the files displayed in step (d) to the printed documents scanned; and (f) calculating a conversion accuracy based on the error count obtained in step (e);

wherein step (c) comprises (c1) calculating a page count of pages of the printed documents scanned, (c2) obtaining a sample percentage from the operator, and (c3) calculating the sample size based on the sample percentage applied to the page count; and wherein step (d) comprises (d1) applying a random number generator function to the page count to produce a number of randomly selected identifiers of the pages scanned, the number of randomly selected page identifiers being equal to the sample size, and (d2) displaying the files representing the sample pages identified by the page identifiers.

3. The method of claim 1 wherein step (a) comprises scanning and converting one or more pages of printed text documents into character data representing one or more characters, step (b) comprises storing the character data into one or more text files, step (d) comprises displaying one or more of the text files to display the characters to the operator, and step (e) comprises obtaining a character error count of incorrectly scanned characters.

4. The method of claim 3 wherein step (f) comprises (f1) calculating a character count of the characters, and (f2) calculating the conversion accuracy as a character accuracy percentage of the character error count relative to the character count.

5. The method of claim 2 wherein step (a) comprises scanning and converting one or more pages of graphic documents into graphic data, step (b) comprises storing the graphic data into one or more bitmap files to display the graphic images to the operator, step (d) comprises displaying one or more of the tagged image format files, and step (e) comprises obtaining a graphic error count of incorrectly scanned pages.

6. The method of claim 5 wherein step (f) comprises (f1) calculating a page count of the pages of graphic documents, and (f2) calculating the conversion accuracy as a graphic accuracy percentage of the graphic error count relative to the page count.

7. The method of claim 2, futher comprising the steps of (g) performing steps (a) through (f) multiple times corresponding to multiple batches of printed documents, and (h) calculating a total conversion accuracy based on the conversion accuracy of all of the multiple batches.

* * * * *